United States Patent
Date et al.

(10) Patent No.: US 7,369,351 B2
(45) Date of Patent: May 6, 2008

(54) MAGNETIC DISK DRIVE AND READ/WRITE METHOD TO REDUCE READ ERROR RATE

(75) Inventors: Kazuyuki Date, Kanagawa (JP); Masayoshi Shimokoshi, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/286,182

(22) Filed: Nov. 22, 2005

(65) Prior Publication Data

US 2006/0139791 A1   Jun. 29, 2006

(30) Foreign Application Priority Data

Dec. 27, 2004  (JP)  ............... 2004-376296

(51) Int. Cl.
  G11B 5/596  (2006.01)
  G11B 5/09  (2006.01)
(52) U.S. Cl. ............... 360/77.08; 360/77.02; 360/53
(58) Field of Classification Search ............... None
  See application file for complete search history.

(56) References Cited

U.S. PATENT DOCUMENTS 6,687,078 B1 *  2/2004  Kim ............... 360/77.04
2003/0156347 A1 *  8/2003  Ishii ............... 360/78.04
2005/0002121 A1 *  1/2005  Allen et al. ............... 360/75

FOREIGN PATENT DOCUMENTS

JP  11-191274  7/1999
JP  2000-322848  11/2000

\* cited by examiner

*Primary Examiner*—Andrew L. Sniezek
(74) *Attorney, Agent, or Firm*—Townsend and Townsend and Crew LLP; Patrick Duncan

(57) ABSTRACT

Embodiments of the invention reduce the error rate of a read error that is caused by a spacing interval between a write head and a read head, which are formed on a slider. In one embodiment, a write head writes user data, which is placed at a position, on a magnetic disk when a read head is placed at a target position in accordance with a head spacing interval and yaw angle. DHO adjustment data is written at a second position, which is obtained by subjecting the read head to DHO correction in order to read the user data written at the target position. When the user data is to be read, a processor reads the DHO adjustment data, changes the read head position to the first position, and controls the operation of a magnetic disk drive to read the user data.

17 Claims, 11 Drawing Sheets

(A)

(B)

(A)

(B)

(A)

(B)

MAGNETIC DISK DRIVE AND READ/WRITE METHOD TO REDUCE READ ERROR RATE

CROSS-REFERENCES TO RELATED APPLICATIONS

This application claims priority from Japanese Patent Application No. JP2004-376296, filed Dec. 27, 2004, the entire disclosure of which is incorporated herein by reference.

BACKGROUND OF THE INVENTION

The present invention relates to a technology for reducing the error rate of a read error that is caused by a spacing interval between a write head and a read head, which are formed on a slider in a magnetic disk drive, and more particularly to a technology for reducing the read error rate of a magnetic disk having a narrow track pitch.

In a magnetic disk drive, a magnetic head is formed on a slider to compose a head/slider assembly. A plurality of servo tracks are concentrically written on a magnetic disk. When the magnetic disk rotates while the head/slider assembly is positioned over a specified servo track, a data read/data write operation is circumferentially performed on the associated data track. As shown in FIG. 10(a), the head/slider assembly 3, which is supported by a head support mechanism, move over the circumference whose radius is equivalent to the distance to a rotation center 5 of the head support mechanism. Therefore, when the magnetic head is positioned over a servo track of the magnetic disk 1, an angle is generated between a line 15 (hereinafter referred to as the pivot center line) that joins the rotation center 5 of the head support mechanism to the center of a short rim of the head/slide assembly 3 and a data track tangent line 9, 13 at the center position of the head/slider assembly. This angle is generally called a yaw angle, which varies in the direction of the servo track radius in accordance with the position.

When the head/slider assembly 3 is positioned over an inner data track 7 on the magnetic disk 1, yaw angle θ1 is formed between the tangent line 9 of a servo track 7 and the pivot center line 15. When the head/slider assembly 3 is positioned over an outer servo track 11, yaw angle θ2 is formed between the tangent line 13 of the servo track 11 and the pivot center line 15. As is obvious from FIG. 10(A), the yaw angle varies with the radial position of the head/slider assembly 3 over the magnetic disk.

As shown in FIG. 10(B), an MR or GMR read head 17 and an inductive write head 19 are formed on the same slider. The read head 17 and write head 19 are formed on a slider surface facing the magnetic disk so that the pivot center line 15 passes through the center between a write gap and read gap. A predetermined head spacing interval L is provided between the read head 17 and write head 19. This spacing interval is in the direction of the pivot center line 15.

As regards the head spacing interval L between the write head 19 and read head 17, a predefined distance, which varies in the direction of the magnetic disk radius in accordance with a yaw angle, is generated. This distance is hereinafter referred to as the dual head offset (hereinafter abbreviated to the DHO). The DHO is a physical distance that is determined by a yaw angle and head spacing interval L. In the magnetic disk drive, the gap between the read head 17 and write head 19 is recognized in terms of the calculated number of servo tracks and used for magnetic head positioning control. Therefore, the DHO may be expressed in terms of the calculated number of tracks. In the present specification, the DHO value representing a physical distance is referred to as a DHO [distance] whereas the DHO value calculated as the number of servo tracks is referred to as a DHO [calculation].

When a data write is performed in the magnetic disk drive, the read head 17 reads servo data, which is written on the magnetic disk, to determine the position of the read head 17, and then the write head 19 writes user data. The read head 17 is used for positioning the head/slider assembly 3. The write head 19 whose distance to the read head 17 is the head spacing interval L is used for a write. Therefore, the actual user data write position in the direction of the magnetic disk radius is offset by the DHO [distance] from a target position, which is the position of a servo track used for positioning. Therefore, when a read is to be performed, the read head 17 needs to be placed at a position that is offset from the target position by the DHO [distance]. The DHO [distance] varies with the yaw angle, that is, the slider position relative to the magnetic disk. To properly place the read head at a written position, therefore, it is necessary that the magnetic disk drive accurately recognize the DHO [distance].

A technology disclosed by Patent Document 1 (Japanese Patent Laid-open No. 2000-322848) writes an off-track measurement pattern, which is shown in FIG. 6(b) of that document, into all servo sectors of tracks to enhance the on-track accuracy prevailing when a composite head performs a read. A technology disclosed by Patent Document 2 (Japanese Patent Laid-open No. 11-191274) performs a track following operation by providing such an offset as to position a write head at the center of a track.

BRIEF SUMMARY OF THE INVENTION

A DHO correction is an operation that is performed to move the read head from a servo track location, which is a target position, to a position at which user data is actually written for the purpose of reading user data that is written at the target position. In the magnetic disk drive, the servo data for positioning the magnetic head is written on the magnetic disk. The servo data includes servo tracks that are organized so that a read signal indicates a radial position on the magnetic disk. The servo tracks, including the innermost and outermost servo tracks on the magnetic disk, are written at a fixed reference track pitch. A processor in the magnetic disk drive recognizes the magnetic head position on the magnetic disk from a servo data signal that is read by executing a positioning control program.

Instead of directly recognizing the DHO [distance] from each servo track, the positioning control program uses the DHO [calculation] to make a DHO correction in accordance with servo data information that is read from the magnetic disk. At a magnetic disk drive manufacturing stage, the DHO of every servo track is measured after servo data is written onto the magnetic disk. The measured DHO is hereinafter referred to as the DHO [measurement]. The DHO [measurement] represents the number of servo tracks with respect to the DHO [distance], and depends on the head spacing interval L, servo track pitch, and yaw angle.

The DHO [measurement] data of all servo tracks may be stored in a memory at a magnetic disk drive manufacturing stage and used at the time of a data read/write. However, the use of such a method is not practical because an enormous memory capacity is required. In a common magnetic disk drive, the memory stores only the DHO [measurement] of several points that are selected in the direction of the magnetic disk radius. As regards servo tracks other than those stored in the memory, the amount of DHO correction is determined using the DHO [calculation], which is calculated from the DHO [measurement]. The positioning control program determines the DHO [calculation] about each servo track by performing linear interpolation between servo tracks or by computing a polynomial approximation.

The DHO [calculation] corresponds to the number of servo tracks with respect to the DHO [distance]. Since data track positional information can be successively acquired from servo data, calculations are performed even when the number of servo tracks is smaller than 1. When a DHO correction is to be made, the processor handles the number of servo tracks that is counted in accordance with a servo data signal, which is read from the magnetic disk, or the number of servo tracks that is derived from the DHO [calculation].

The DHO [measurement] stored in the memory is a value that is a measured number of servo tracks, which are written at the reference track pitch. The positioning control program is formulated so as to determine the DHO [calculation] on the presumption that the servo tracks are written at the reference track pitch. To make a DHO correction for accurately positioning the read head for a user data read, therefore, it is necessary that the track pitch of servo tracks written on the entire magnetic disk agree with the reference track pitch.

In reality, however, the track pitch of actually written servo tracks may deviate from the reference track pitch regardless of whether a self servo write method or servo track writer is used. It is difficult to provide a track pitch in precise agreement with the reference track pitch particularly when the track pitch is narrow. If the magnetic disk track pitch locally deviates from the reference track pitch, the DHO [calculation], which indicates a position at which user data is written, cannot properly be calculated by performing interpolation or polynomial approximation on such a locally affected area. In such an instance, a user data read error frequently occurs due to improper DHO correction.

If, referring to FIG. 11(A), servo tracks are written in a servo sector at a reference track pitch P of 300 nm and the DHO [distance] 27 between the read head 17 and write head 19, which are formed on the slider 3, is 3000 nm over a servo track 21 that serves as a target position, the DHO [distance] 27 corresponds to 10 tracks (3000/300=10). Therefore, the positioning control program should be prepared so that the DHO [calculation] 28 of the target servo track 21 is calculated at 10 tracks at the time of a read.

When user data is to be written at a position 23 with a servo track 21 set as a target, the read head 17 is first positioned over the target servo track 21. The write head 19 is formed on the slider 3 on which the read head is formed as well. Therefore, the user data 25 is written in a data sector that is located at the position 23, which is at a distance of the DHO [distance] 27 from the servo track 21 at which the read head 17 is positioned. In this instance, the write head 19 writes the user data at the position 23, which is located 10 tracks away from the target position 21. When user data is written on the magnetic disk with a servo track set as a target position as described above, the write head performs a write at a position that is at a distance of the DHO [distance] from the target servo track. The position of the read head 17 or the position of the write head 19 means the center of a read gap or the center of a write gap.

When reading the user data 25, the positioning control program makes a DHO correction in accordance with information indicating that the DHO [calculation] of the servo track 21 is 10 tracks. More specifically, the positioning control program moves the read head 17 from the servo track 21 to the position 23, counts the number of servo tracks, and sets the read head 17 at the position 23, which is the position of the 10th track. When the track pitch of the servo tracks agrees with the reference track pitch, the agreement with a distance obtained by counting the number of servo tracks by the DHO [distance] and DHO [calculation] is obtained so that the read head 17 is set at the position 23, which is offset by 3000 nm from the target position 21. The position 23 is the center of a radial position of the magnetic disk at which the user data 25 is written, and an ideal position of the read head 17 for a read.

If, on the other hand, the servo track pitch P1 is smaller than the reference track pitch by 4% within a local area of the magnetic disk as shown in FIG. 11(B), the read head cannot be positioned at the center of user data at the time of a read. When data is to be written on a target servo track 29, the read head is set at a target position 29 in the same manner as indicated in FIG. 11(A). The write head 19 writes user data 39 at position 37, which is at a distance of the DHO [distance] 27 (3000 nm) from the target servo track 29 over which the read head 17 is positioned.

At the time of a read, the positioning control program uses a linear interpolation expression to calculate the DHO [calculation] 33 of the servo track 29 at 10 tracks. To make a DHO correction, the processor counts the number of passing servo tracks while moving the read head 17 from the servo track 29 to a position 37, and sets the read head 17 at a position 35, which is the position of the 10th track. In this instance, the track pitch P1 of servo tracks is smaller than the reference track pitch by 4%. Therefore, the distance for 10 tracks is $10 \times 300 \times (1-0.04)=2880$ nm so that the offset between the position 35 and position 37, at which the data 39 is actually written, is 120 nm (3000−2880=120). The offset amount increases with an increase in the DHO [distance]. In the current example, the offset amount is as great as 40% of one track pitch. Consequently, a read error occurs because it is difficult for the read head to read user data.

A feature of the present invention is to provide a magnetic disk drive that reduces the occurrence of a user data read error arising out of a DHO correction error. Another feature of the present invention is to provide a magnetic disk drive that reduces the occurrence of a user data read error arising out of track pitch changes. Still another feature of the present invention is to provide a user data read/write method that reduces the occurrence of a read error in a magnetic disk drive.

According to a first aspect of the present invention, there is provided a magnetic disk drive comprising a slider on which a write head and a read head are positioned at a predetermined spacing interval; a head support mechanism that carries the slider and pivots on a rotation shaft; a magnetic disk on which DHO adjustment data is written and placed at a DHO-corrected position of the read head for reading user data written at a target position; and a processor for exercising operational control over the magnetic disk drive to read the DHO adjustment data, adjust the position of the read head, and read the user data.

A DHO correction is made in accordance with servo data written on the magnetic disk to set the read head, at the time of a read, at a position at which user data is written. The DHO adjustment data is used to adjust the read head position if the DHO-corrected read head position is improper. The DHO adjustment data may be a value that enables the processor to recognize the position of user data that is actually written at a target position. It may represent the number of servo tracks that corresponds to the difference between the position of user data written at a target position and the DHO-corrected read head position. When the DHO adjustment data is written at a read head position that is DHO-corrected with respect to a target servo track, the read head can accurately read the DHO adjustment data even if the track pitch of servo tracks locally deviates from the reference track pitch. Further, it is possible to use the DHO adjustment data for properly setting the read head at a position at which user data is written, and read the user data while reducing the occurrence of a read error.

Further, the DHO adjustment data may represent the number of servo tracks that are written on the magnetic disk and placed between a target position and a position at which user data is written. When the DHO adjustment data is written in all servo tracks on the magnetic disk, including the innermost and outermost servo tracks, the DHO corrections made on all servo tracks can be adjusted. The DHO adjustment data may be written in either a servo track or data sector. Further, if a plurality of DHO adjustment data are circumferentially written on the magnetic disk, the magnetic disk rotational delay for adjusting the DHO-corrected read head position can be reduced.

According to a second aspect of the present invention, there is provided a magnetic disk drive comprising a slider on which a write head and a read head are positioned at a predetermined spacing interval; a head support mechanism that carries the slider and pivots on a rotation shaft; a magnetic disk on which DHO adjustment data is written and placed at a target position for a user data write; and a processor for exercising operational control over the magnetic disk drive to read the DHO adjustment data with the read head, adjust the position of the read head, and write the user data.

When the DHO adjustment data is written on a target servo track over which the read head is to be positioned for the purpose of writing user data, the write position can be adjusted at the time of a user data write. Since the user data is written at a position at which the read head is positioned when a DHO correction is made, it is possible to reduce the occurrence of a read error without deteriorating the read performance.

The present invention provides a magnetic disk drive that reduces the occurrence of a user data read error arising out of a DHO correction error. Further, the present invention provides a magnetic disk drive that reduces the occurrence of a user data read error arising out of track pitch changes. Furthermore, the present invention provides a user data read/write method that reduces the occurrence of a read error in a magnetic disk drive.

DETAILED DESCRIPTION OF THE INVENTION

Figure 1:
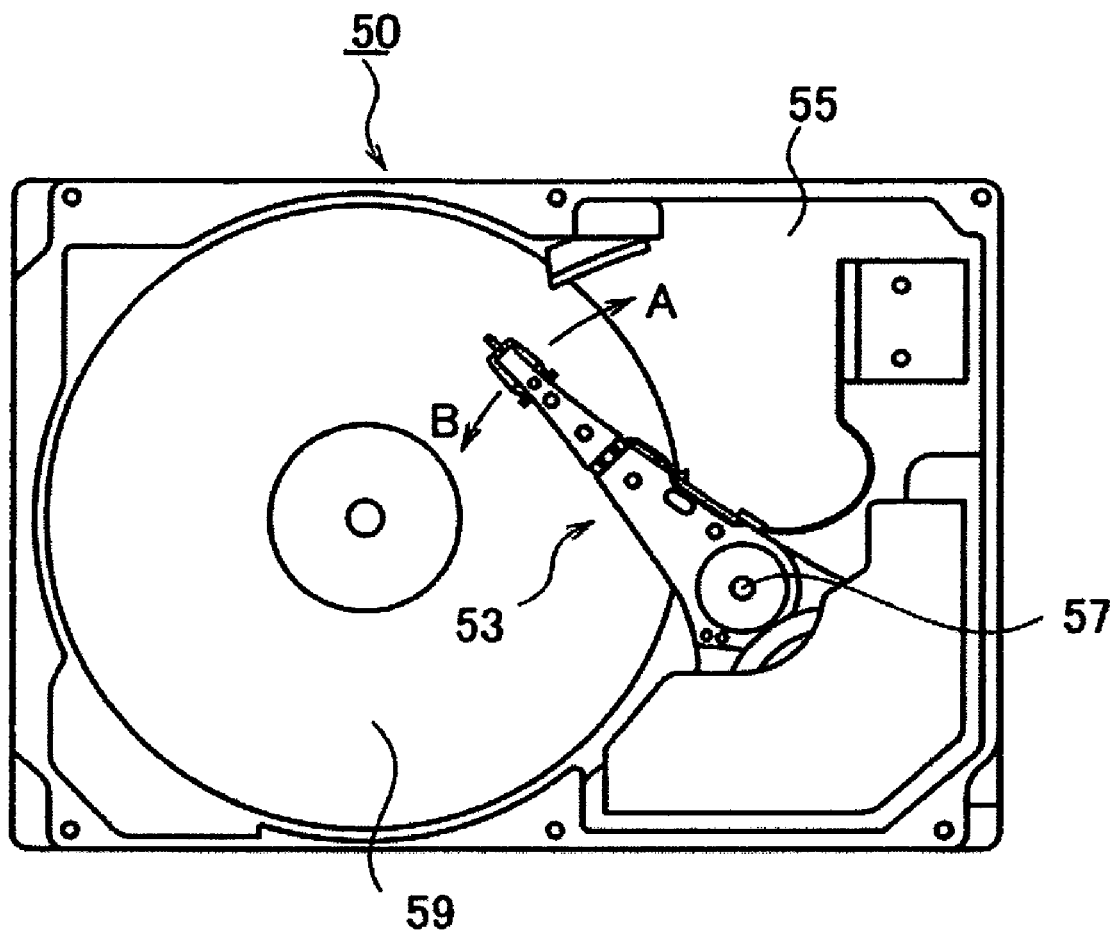
FIG. 1 is a plan view of a magnetic disk drive.

FIG. 1 is a plan view that schematically illustrates the configuration of a magnetic disk drive 50 according to one embodiment of the present invention. A magnetic disk 59 and a head support mechanism 53 are mounted on a base 55. The head support mechanism 53 has a rotary actuator structure. A head/slider assembly is mounted on the end of the head support mechanism 53. The head support mechanism 53 pivots on a pivot shaft 57 in the direction of arrow A or B. A read and a write head are formed on the head/slider assembly and positioned at a predetermined distance from each other.

FIGS. 2(A) and 2(B) show a typical format of servo sectors 103 and data areas 105 on the magnetic disk 59. The format of the magnetic disk 59 is employed for magnetic disk drives that use a data surface servo method. However, the present invention is not limited to magnetic disk drives that use the data surface servo method. The present invention can also be applied to magnetic disk drives that use a servo surface servo method. When a plurality of magnetic disk recording surfaces are provided by a magnetic disk drive that employs the data surface servo method, the magnetic disk recording surfaces have the same format. As shown in FIG. 2(A), the servo sectors 103 are formed on the entire surface of the magnetic disk 59 and radially extended from the innermost end to the outermost end. A plurality of such radial servo sectors 103 are arranged discretely in the circumferential direction of the magnetic disk. Servo data is written in each servo sector 103. The servo sectors 103 and data areas 105 are alternately positioned in the circumferential direction of the magnetic disk 59.

In the data areas 105 of the magnetic disk 59, a plurality of concentric data tracks 101 are defined by servo data. The data tracks are circumferential write areas in which the write head writes user data when the read head is placed at a target position in accordance with positional information derived from the servo data. As indicated in FIG. 2(B), each data area 105 comprises n data sectors, which each contain a 512-byte data write area.

Figure 2:
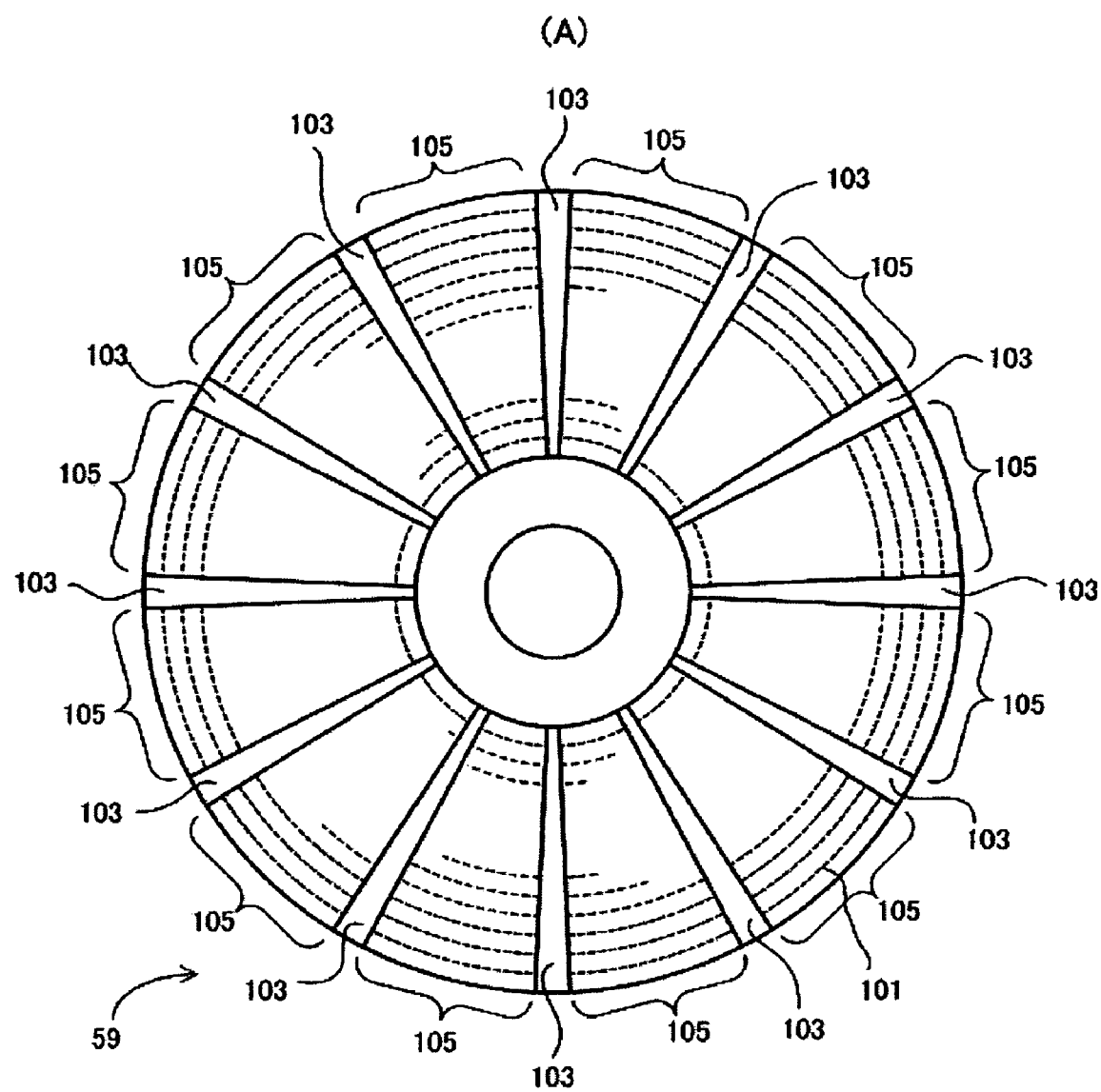
FIGS. 2(A) and 2(B) illustrate the format of a magnetic disk.
Figure 2:
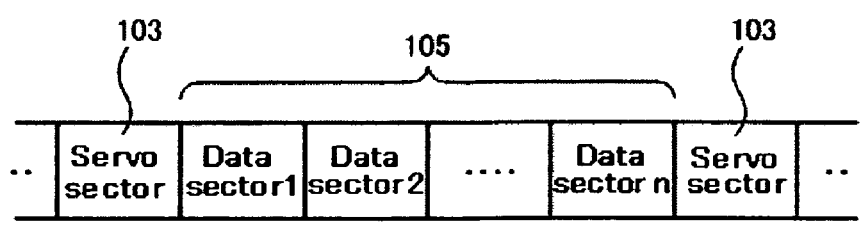
Figure 3:
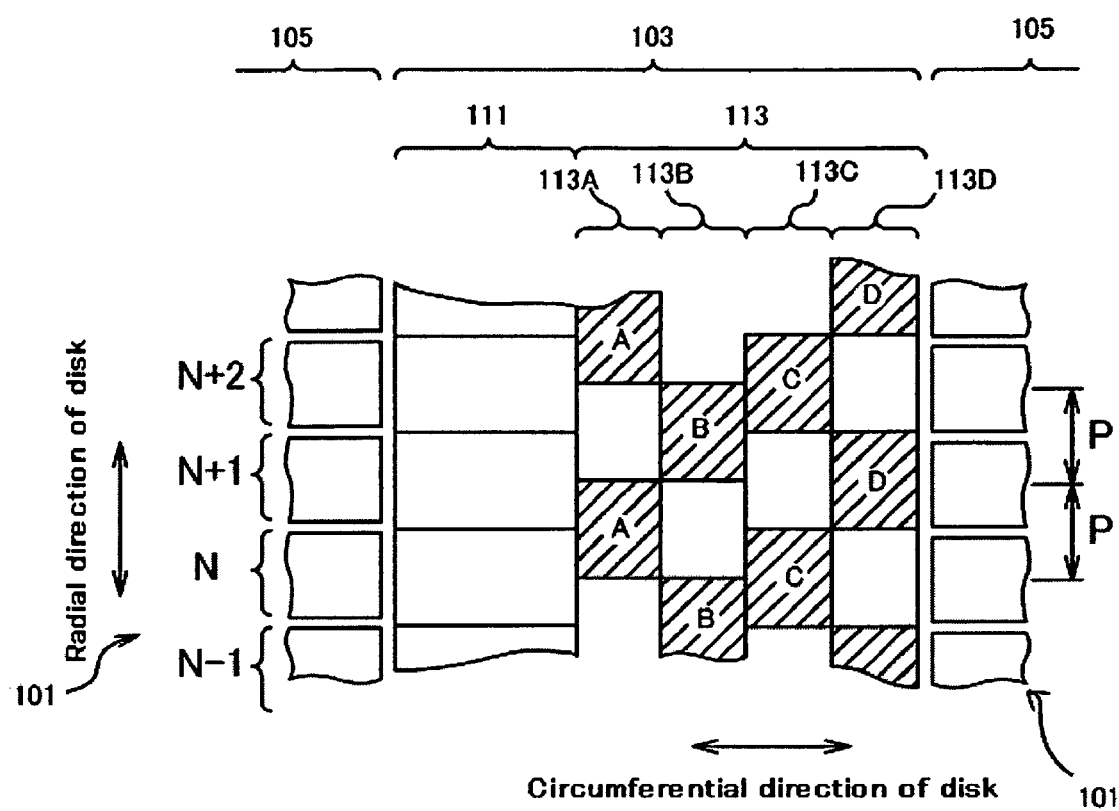
FIG. 3 is an enlarged view illustrating the format of a magnetic disk.

FIG. 3 is an enlarged view illustrating a part of the format of the magnetic disk 59 that is shown in FIG. 2. FIG. 3 shows data track N−1, data track N, data track N+1, and data track N+2, which are defined in a data area 105, and a servo sector 103, which is adjacent to the data tracks in the circumferential direction of the disk. Since there is a yaw angle between the write head and read head, which are formed on a slider, there is no direct correlation between the data tracks 101 and servo sector 103, which are adjacent to each other.

The servo sector 103 comprises an identification information area 111 and a burst pattern area 113. The burst pattern area 113 includes main burst pattern rows 113A, 113B and sub-burst pattern rows 113C, 113D, which are arranged in the radial direction of the magnetic disk 59. The burst pattern rows 113A, 113B, 103C, and 113D respectively comprise burst patterns A, B, C, and D, which are written in such a manner that the dimensions are equal in the radial direction of the disk.

The main burst pattern rows 113A and 113B constitute a main burst pattern. They are written at such positions that their read signals are 180 degrees out of phase with each other when the read head moves in the radial direction of the disk. The sub-burst pattern rows 103C and 103D constitute a sub-burst pattern. They are written at such positions that their read signals are 180 degrees out of phase with each other when the read head 17 moves in the radial direction of the disk. The main burst pattern and sub-burst pattern are written in such a manner that their read signals are 90 degrees out of phase with each other.

The dimension of each burst pattern in the radial direction of the disk, that is, a burst pattern pitch, constitutes a servo track pitch P. A radial position at which a switch is made from main burst pattern A to main burst pattern B or vice versa is referred to as a main burst pattern center. A radial position at which a switch is made from sub-burst pattern C to sub-burst pattern D or vice versa is referred to as a sub-burst pattern center. The burst patterns constitute a servo track. The main burst pattern center is a servo track center.

On the magnetic disk 59, the servo track center coincides with the center of a data track 101. However, the present invention is not limited to such a configuration. The present invention can also be applied to a configuration in which the servo track center does not coincide with the center of a data track. In a magnetic disk drive disclosed, for instance, by Japanese Patent Laid-Open No. 30778/2004, the main burst pattern center does not coincide with the data track center. Further, it is possible, as described later, to acquire contiguous positions, which are arranged in the radial direction of the magnetic disk, from servo data, and count the number of tracks even when it is smaller than 1. Therefore, the servo track pitch does not always have to be in agreement with the data track pitch.

A servo sector start code is written at the beginning of the identification information area 111. A Gray code (cyclic binary code) representing a servo track identification number, a code representing a physical identification number of a servo sector 103, and the like are written in the identification information area 111.

Figure 4:
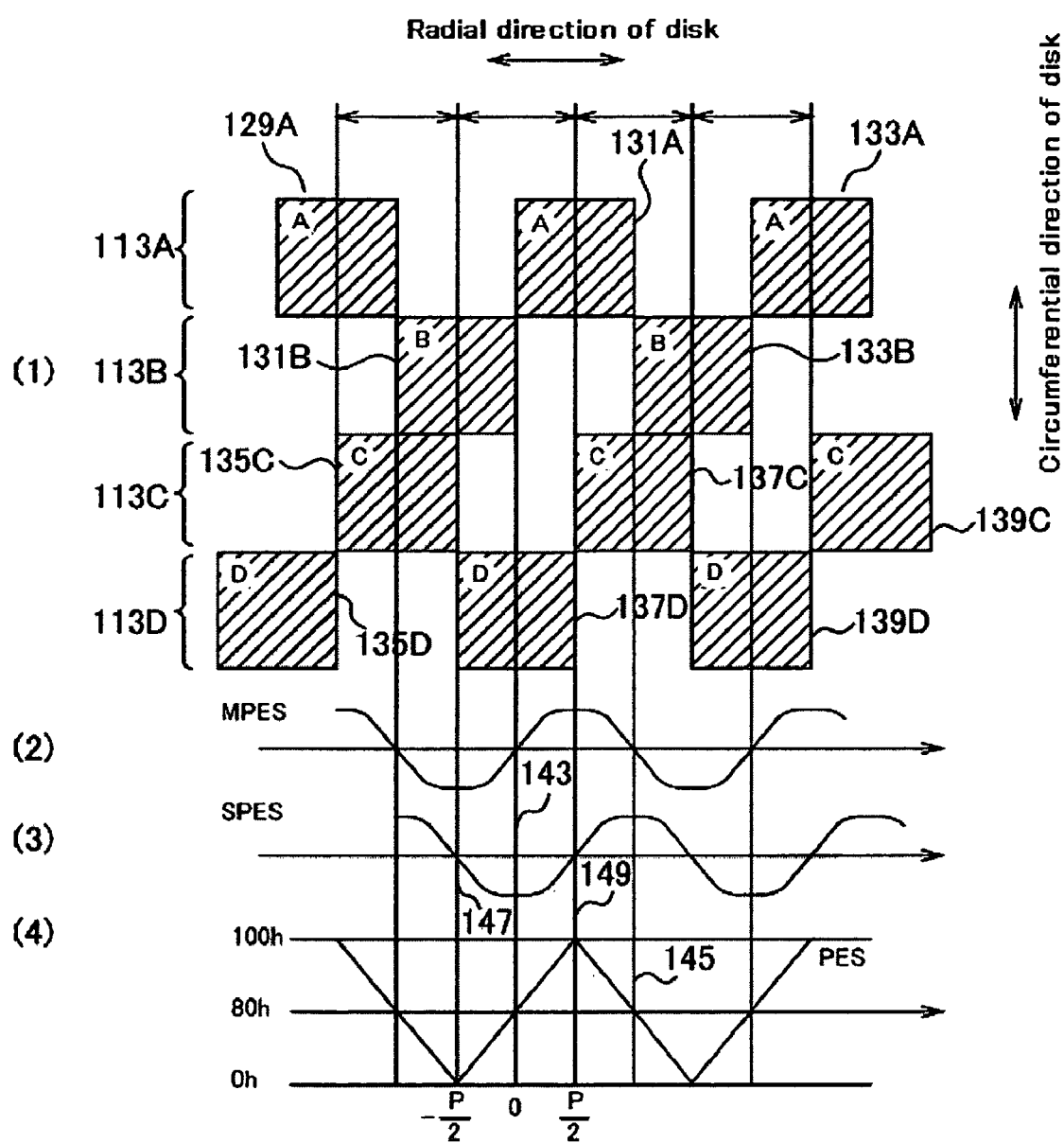
FIG. 4 illustrates a PES that is obtained by reading servo data.

FIG. 4 illustrates how the main burst pattern rows 113A, 113B and sub-burst pattern rows 113C, 113D shown in FIG. 3 are read by the read head to generate a positional information signal (hereinafter referred to as the PES). The main burst patterns constituting the main burst pattern row 113A are designated as 129A, 131A, and 133A. The main burst patterns constituting the main burst pattern row 113B are designated as 131B and 133B. The sub-burst patterns constituting the sub-burst pattern row 113C are designated as 135C, 137C, and 139C. The sub-burst patterns constituting the sub-burst pattern row 113D are designated as 135D, 137D, and 139D.

For error rate reduction and other purposes, the dimension of a read gap that is provided for the read head for reading a burst pattern is shorter than the servo track pitch P or data track pitch P. Therefore, when the burst patterns shown in (1) of FIG. 4 are read and reproduced while moving the read head in the radial direction of a rotating magnetic disk, a main position detection signal (hereinafter referred to as the MPES), which varies as indicated in (2) of FIG. 4, is obtained from the main burst pattern rows 113A and 113B, and a sub-position detection signal (hereinafter referred to as the SPES), which varies as indicated in (3) of FIG. 4, is obtained from the sub-burst pattern rows 113C and 113D.

In FIG. 4, the radial position on the magnetic disk 59 is indicated as the read gap center of the read head. More specifically, it is indicated as the magnetic center position of the read gap. As indicated in (2) of FIG. 4, the MPES linearly increases or decreases when the read head passes a position near the center 143 of a main burst pattern composed by the main burst patterns 131B and 131A and the center 145 of a main burst pattern composed by the main burst patterns 131A and 133B. However, the value of the MPES temporarily remains constant when the read head passes a position near the center 147 of a sub-burst pattern composed by the sub-burst patterns 135C and 137D and the center 149 of a sub-burst pattern composed by sub-burst patterns 137D and 137C.

As indicated in (3) of FIG. 4, the SPES linearly increases or decreases when the read head passes a position near the sub-burst pattern center 147 or 149. However, the value of the SPES temporarily remains constant when the read head passes a position near the main burst pattern center 143 and the main burst pattern center 145.

The above phenomena occur because the lengthwise dimension of the read head read gap is shorter than the radial length of each burst pattern. The period during which the value of the MPES or SPES remains unchanged without regard to the movement of the read head is referred to as a dead zone. While the read head is within the dead zone, the positional information about the read head cannot be obtained from the MPES or SPES. In the present embodiment, the read position within a servo track pitch P, which is represented by the main burst pattern centers 143 and 145, is indicated by 256 different digital values. A digital value between 0 and 255 causes the magnetic disk drive to recognize the radial position of the read head.

The MPES varies in both directions from a bias value of 80 h. The SPES varies in the same manner as the MPES except that the former varies in both directions from a bias value of 100 h or 0 h. The magnetic disk drive recognizes changes in the radial position of the read head as the MPES or SPES changes. Therefore, the MPES can be used as positional information at a position near the main burst pattern center 143 or 145 where the MPES changes linearly. However, the MPES cannot be used as positional information at a position near the sub-burst pattern center 147 or 149 where the MPES value remains unchanged even when the read head position changes. However, the SPES changes linearly at a position near the sub-burst pattern center 147 or 149. Therefore, the SPES is used when the read head is placed at such a position. When the employed positional information signal switches between the MPES and SPES depending on the read head position as described above, a PES suitable for head position control is obtained from the MPES and SPES.

Drawing (4) in FIG. 4 illustrates a PES that is generated by combining the linear portions of the MPES and SPES. In a PES generation process, a bias value of 100 h is added to the SPES in a region where the SPES increases. No such bias value is added in a region where the SPES decreases. For a portion in which the SPES exceeds 100 h, an excess value is subtracted from 100 h. For a portion in which the SPES is smaller than 0 h, calculations are performed so that an absolute value for a value smaller than 0 h is added to 0 h. As a result, a PES having a repetition characteristic alternating between 0 h and 100 h as shown in (4) of FIG. 4 is obtained.

When the magnetic disk drive accesses a data track or cylinder containing a data sector designated by a host apparatus, the head/slider assembly performs a seek operation to reach a target position, and the read head reads servo data to recognize the servo track identification number and passed servo track count from a Gray code in the identification information area 111. At a position near a target servo track, a following operation is performed after accurate positioning is accomplished with a burst pattern.

A write is performed so that the servo track pitch remains constant throughout the entire magnetic disk. Therefore, the magnetic disk drive can recognize the read head position by counting the number of servo tracks with a read head's read signal. A gray code may be used to count the number of servo tracks when there are one or more servo tracks. The PES may be used to count the number of servo tracks when there is less than one servo track. If, for instance, one servo track pitch is set to a digital value of 255, which is derived from the PES, a 0.5 track is recognized as the value 128.

FIRST EMBODIMENT

Adjusting the Head Position at the Time of a Read

Figure 5:
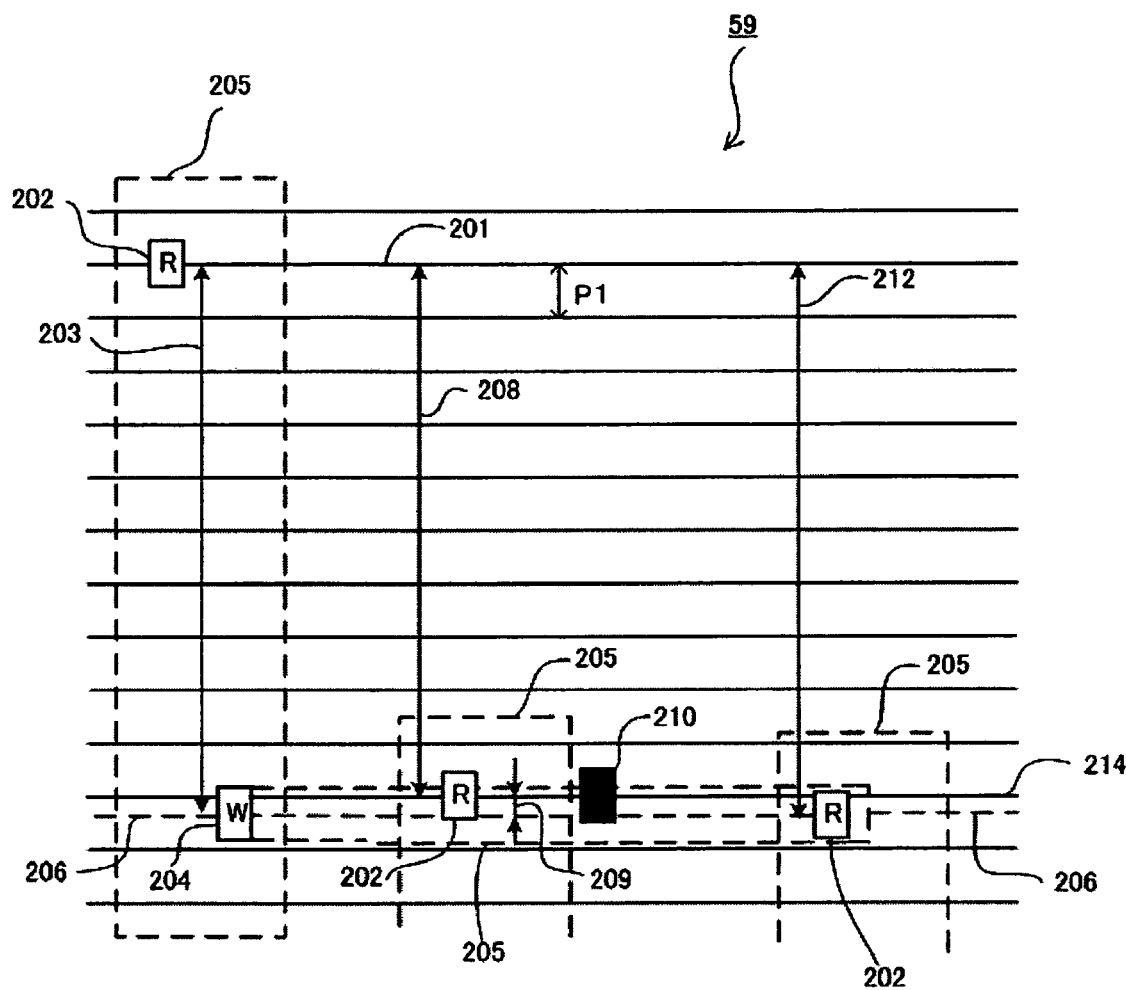
FIG. 5 illustrates how a servo track is configured for a read/write operation according to a first embodiment of the present invention.
Figure 6:
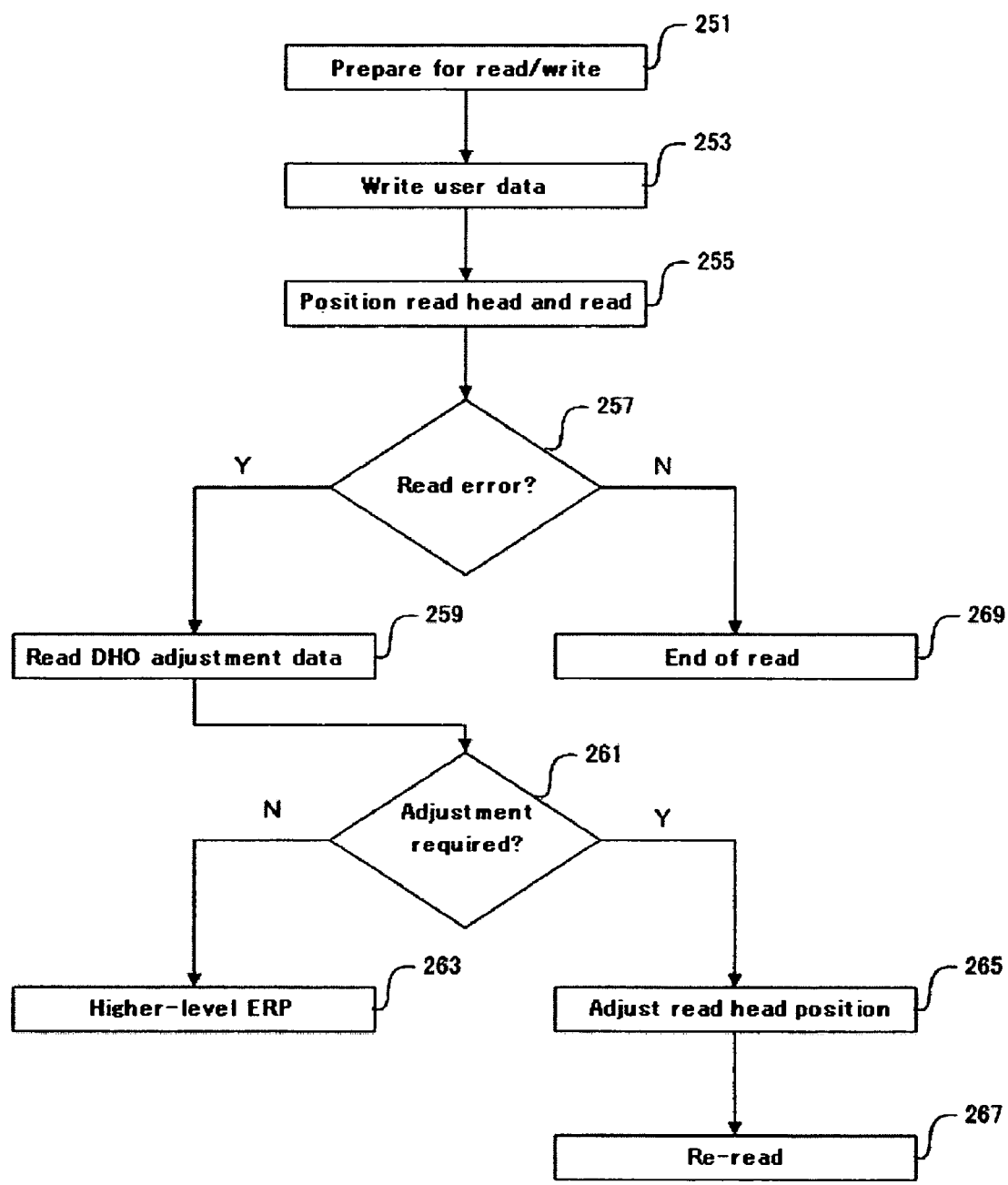
FIG. 6 is a flowchart that illustrates a read/write procedure according to the first embodiment of the present invention.

Referring to FIGS. 5 and 6, the following describes a data read/write method for accurately placing the read head at a position at which user data is written even when the servo track pitch locally varies. FIG. 5 illustrates a part of a servo sector 103 of the magnetic disk 59. FIG. 6 is a flowchart illustrating read/write steps. To properly position the read head, a processor in the magnetic disk drive executes a positioning control program to adjust the DHO-corrected read head position.

In step 251, a read head 202 and a write head 204 are formed on a slider 205 and positioned at a predetermined spacing interval. Servo tracks are radially written in the entire servo sector 103 at a reference track pitch P (300 nm). It is assumed, however, that servo tracks within a particular local range are written at a track pitch P1 of 288 nm, which is shorter than the reference track pitch by 4% as indicated in FIG. 5.

Within the servo sector 103 of the magnetic disk 59, DHO adjustment data 210 is written at a position 214. The DHO adjustment data 210 is used to adjust the difference between a read head position that is obtained when the position of the read head 202 is DHO-corrected by the positioning control program at the time of a data read and a position at which actual user data is written. The DHO adjustment data 210 comprises 2 to 3 bytes. It is radially written on the magnetic disk in relation to all servo tracks, including the innermost and outermost servo tracks. The DHO adjustment data 210 may alternatively be written only on servo tracks whose track pitch varies. Further, the DHO adjustment data 210 is circumferentially written in one or more servo sectors concerning the same servo track or circumferentially written in one or more data sectors concerning the same servo track. The magnetic disk rotational delay for adjusting a DHO correction decreases with an increase in the number of circumferentially arranged DHO adjustment data. The method for writing the DHO adjustment data will be described later.

It is assumed that the DHO [distance] 203 between the read head 202 and write head 204 is 3000 nm at a target servo track 201 onto which user data is to be written. Since the magnetic heads have a DHO [distance], the servo track 201, which is a target position, does not coincide with a radial position 206 at which actual user data is to be written. In step 253, the read head 202 is positioned over the target servo track 201 in order to write user data on the target servo track 201. In this instance, the write head 204 writes user data 205 in a data area 105 at the position 206 that is at a radial distance of the DHO [distance] 203 from the read head 202. When an attempt is made to write user data on a target servo track as described above, the write head becomes positioned in such a manner that the read head is positioned over the target servo track, and writes the user data in a data sector within the data area 105.

To read the user data written on the target servo track 201, the positioning control program calculates, in step 255, the DHO [calculation] 208 for the target servo track 201 with the DHO [measurement] and linear interpolation expression and informs a servo control section of the calculation result. Since the DHO [measurement] is based on the reference servo track pitch P and the DHO [distance] for a yaw angle, the positioning control program calculates the DHO [calculation] at 10 tracks from the DHO [distance] (3000 nm) and reference servo track pitch (300 nm). While moving the read head 202 toward the position 206, the servo control section counts the number of passing data tracks with a Gray code and burst pattern. When a count of 10 tracks is reached, the servo control section places the read head at the position 214 and makes a DHO correction. After completion of DHO correction, a read/write channel reads the user data. The DHO correction is made to count the number of actually written servo tracks in accordance with the DHO [calculation] concerning the target servo track and place the read head at a position at which the user data is written for the purpose of reading the user data written on the target servo track.

The position 214, which is 10 tracks (this value corresponds to the DHO [calculation]) away from the target servo track 201, is such that the associated track pitch P1 is 288 nm, which is smaller than the reference track pitch P by 4%. Thus, 288×10=2880 nm. This distance is shorter than the distance (3000 nm) between the target servo track 201 and the position 206 at which the actual user data is written. In a magnetic disk area where the track pitch varies from the reference track pitch, the read head cannot be accurately placed at a user data write position even when a DHO correction is made. The displacement amount resulting from the DHO correction increases when the DHO [distance] increases or when the servo track pitch decreases to increase the DHO [calculation].

Step 257 is performed to judge whether a read error exists in the read user data. The position 214 is displaced from the position 206, at which the user data is written, by the amount indicated by the reference numeral 209. Therefore, a read error may occur due to an improper data read operation. More specifically, the read data signal output may be lowered or the read signal may mix with the read signal from data written on an adjacent track. The read error occurs if correct data cannot be read even when an error correction is made by an ECC code written in a data sector or an error recovery procedure (ERP) is performed. If no read error occurs in step 257, the program flow proceeds to step 269. In step 269, the read operation terminates. Adjusting the DHO-corrected read head position with the DHO adjustment data adversely affects the read performance. The influence on the performance can be reduced by determining whether or not to adjust a DHO correction depending on the occurrence of a read error.

If a read error occurs, step 259 is performed to read the DHO adjustment data 210. The DHO adjustment data 210 is the number of servo tracks 209 that corresponds to the difference between the DHO [distance] 203 and the distance to a DHO-corrected position that is obtained by counting the number of servo tracks written on the magnetic disk in accordance with the DHO [calculation] 208, and written on the magnetic disk prior to magnetic disk drive shipment. In the present case, the DHO [distance] is 3000 nm and the servo track pitch P1 is 288 nm. Thus, 3000/288=10.4 tracks. Consequently, the DHO adjustment data is 0.4 track.

After the DHO adjustment data 210 is read, the program flow proceeds to step 261. Step 261 is performed to judge whether the DHO adjustment data value is greater than a predetermined value, that is, to judge whether the position of the read head 202 needs to be adjusted. If the value of the DHO adjustment data 210 is smaller than the predetermined value, the DHO correction is properly made so that the cause of the read error needs to be investigated again. Therefore, the program flow interrupts the user data read operation and proceeds to step 263. Step 263 is followed to perform a higher-level ERP or state the occurrence of a hard error. If the value of the DHO adjustment data 210 is greater than the predetermined value, the track pitch differs from the reference track pitch so that the DHO-corrected read head position does not coincide with a user data write position. Therefore, the program flow proceeds to step 265 for the purpose of adjusting the position of the read head 202.

In step 265, the positioning control program calculates the DHO [calculation] 212 in accordance with the DHO adjustment data 210, and the servo control section places the read head 202 at the position 206 at which the user data is written. In step 267, the read/write channel reads the user data again. Since the user data is written at the position 206, the DHO correction is adjusted at this stage. Therefore, the read error, which is attributable to the DHO-corrected read head position, is cleared. The DHO adjustment data 210 may comprise the DHO [calculation] or the number of tracks that indicates the position 206 concerning the target servo track 201 instead of the number of servo tracks that corresponds to the difference between the position 214 and position 216. In such an instance, the DHO adjustment data 210 to be written is 10.4 tracks, which corresponds to the value of the DHO [calculation] for the target servo track 201.

The method for writing the DHO adjustment data 210 will now be described with reference to FIG. 7. In a test/adjustment process that is performed after completion of magnetic disk drive hardware assembly, a test program is executed to write the DHO adjustment data 210 in a magnetic disk servo sector. Although the DHO adjustment data may be written in a magnetic disk data area, the following explanation assumes that the DHO adjustment data is to be written in a servo sector.

Figure 7:
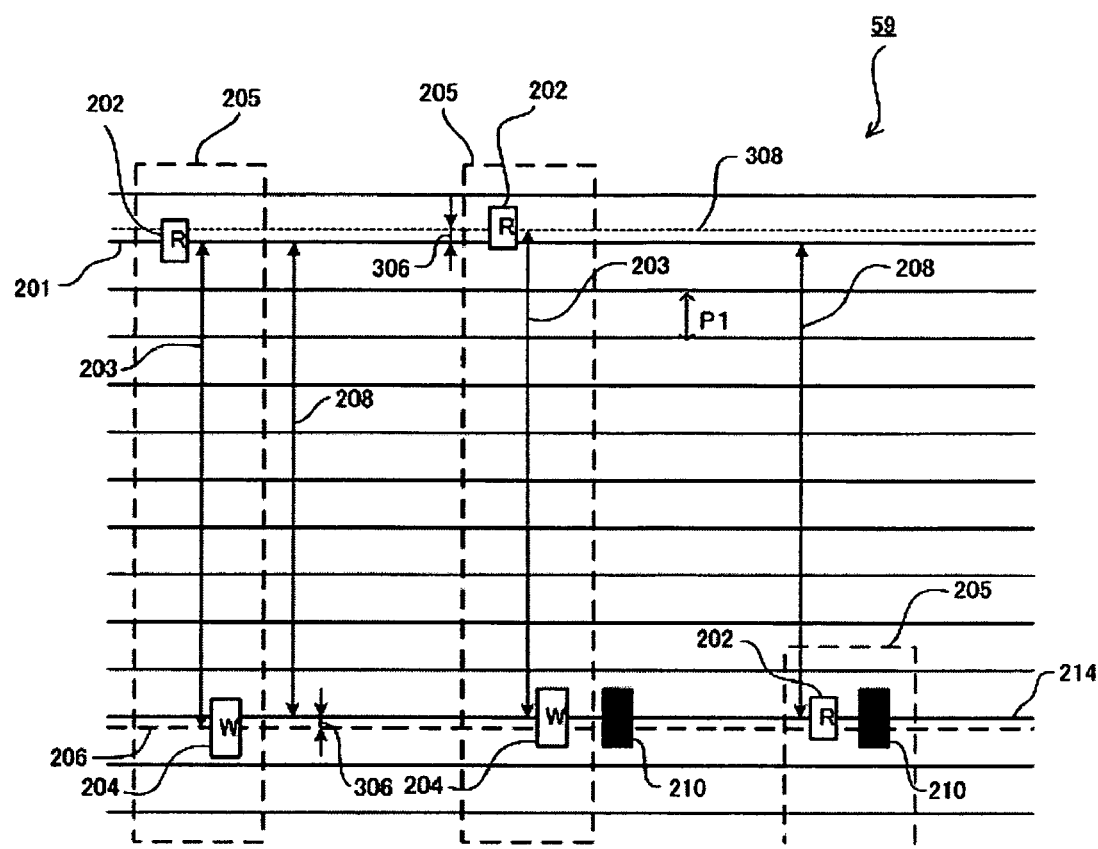
FIG. 7 illustrates a procedure that is performed to write DHO adjustment data onto a magnetic disk in accordance with the first embodiment of the present invention.

FIG. 7 illustrates a storage area of the same magnetic disk 59 as shown in FIG. 5. In FIG. 7, the servo track pitch P1 is shorter than the reference servo track pitch P (300 nm) by 4%. The DHO [distance] 203 of the write head 204 and read head 202 is 3000 nm in relation to the target servo track 201. The method for writing the DHO adjustment data 210 for the target servo track 201 will now be described. First of all, the processor in the magnetic disk drive positions the read head 202 over the target servo track 201 and writes test data at the position 206 with the write head 204.

Next, the processor executes the positioning control program to calculate the DHO [calculation] concerning the target servo track 201. The processor uses a Gray code read from servo data and a PES generated from the servo data to place the read head 202 at a position designated by the DHO [calculation] 208. As described above, the processor makes a DHO correction by controlling the read head position. In accordance with the reference track pitch (300 nm) and DHO [distance] 203, the positioning control program calculates the DHO [calculation] 208 at 10 tracks. As a result of DHO correction, the read head 202 is placed at the position 214. After the read head 202 is placed at the position 214, the read/write channel reads the test data with the read head 202.

If the read head 202 cannot read the test data in the above instance, the PES is used to gradually move the read head 202 until the read head 202 reaches a position at which the read head 202 can properly read the test data. At the same time, the magnitude of the read signal is monitored so as to place the read head at a position at which the read signal is maximized. If the magnitude of the read signal is smaller than a predetermined threshold value, the PES is used to move the read head to a position at which the read signal is maximized regardless of whether the read head 202 can read the test data at the position 214.

If the read signal of the test data that the read head 202 has read at the position 214 is greater than the predetermined value, the positioning control program does not have to adjust the DHO correction. Within a procedure described below, therefore, either zero or the DHO [calculation] value (10 tracks), which is calculated by the positioning control program, is written as the DHO adjustment data. The test program stores in a memory the number of servo tracks 306, which corresponds to the difference between the position 206 and position 214. The number of tracks 306 corresponds to the value of the DHO [calculation], which is used for DHO [calculation] adjustment. In this instance, the DHO [calculation] 306 is calculated at +0.4 track (3000 nm/288 nm−10). When the DHO adjustment data is to be written, the read head 202 is positioned over the target servo track 201 and placed at a position 308, which is shifted by the DHO [calculation] 306. In this instance, the write head 204 is placed at the position 214, which is positioned at a distance of the DHO [distance] 203. The test program uses the write head 204 to write "+0.4 track" at the servo sector position 214 as the DHO adjustment data 210.

The DHO adjustment data value for the target servo track 201 is +0.4 track, which represents the number of the servo tracks 306 written on the magnetic disk that corresponds to the difference between the position 206 and position 214, or 10.4 tracks, which represents the DHO [calculation] of the position 206 concerning the target servo track 201. The DHO adjustment data 210 written in this manner is properly read when the positioning control program calculates the DHO [calculation] 208 for the target track 201, makes a DHO correction, and places the read head 202 at the position 214. The read head 202 reads the DHO [calculation] (+0.4 track) of the difference between the position 204 and position 206 or the DHO [calculation] (10.4 track) of the position 206 and instructs the servo control section so that the positioning control program adjusts the position of the read head 202. If the DHO adjustment data is zero or 10 tracks, the positioning control program does not adjust the position of the read head.

SECOND EMBODIMENT

Adjusting the Head Position at the Time of a Write

Figure 8:
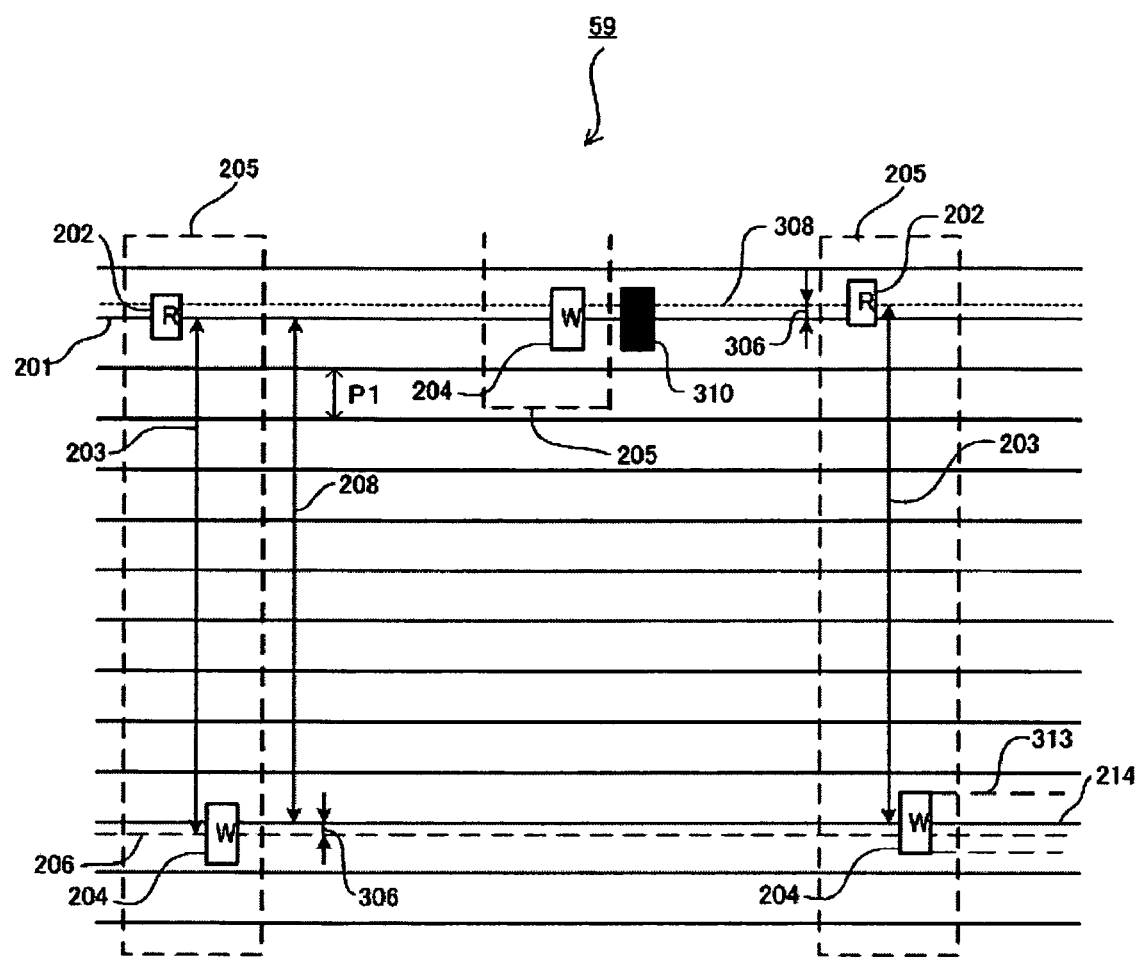
FIG. 8 illustrates how a servo track is configured for a read/write operation according to a second embodiment of the present invention.

In the first embodiment, data is read with a DHO correction made with the DHO adjustment data. Referring to FIG. 8, the following describes a user data read/write method for writing user data with the read head position adjusted with the DHO adjustment data and causing the positioning control program to make a DHO correction and place the read head at a user data write position even when the track pitch locally varies. FIG. 8 illustrates the procedures for writing the DHO adjustment data 310 on the target servo track 201 and writing user data.

The servo track pitch P1 and DHO [distance] shown in FIG. 8 are the same as those in FIG. 7. The test data write method is the same as described with reference to FIG. 7. The test program stores in the memory the value of the DHO [calculation] 306, which represents the number of tracks that corresponds to the difference between the position 206 and position 214, then causes the positioning control program to calculate the position of the read head 202 for positioning the write head 204 over the target servo track 201, and places the read head 202 at the calculated position.

Next, the write head 204 writes the DHO adjustment data 310 on the target servo track 201. The DHO adjustment data 310 is a value (+0.4 track) of the DHO [calculation] 306, which corresponds to the difference between the position 206 and position 214. When data is to be written on the magnetic disk 59 with the DHO adjustment data 310 written on the target servo track 201 as described above, the read head 202 is first positioned over the target servo track 201 to read the DHO adjustment data 310. If the DHO adjustment data is greater than a predetermined value, the positioning control program places the read head 202 at the position 308 that is shifted upward from the target servo track 201 by +0.4 track, which is stipulated by the DHO adjustment data. If the sign of the DHO adjustment data is reversed, that is, the value "−0.4 track" is stipulated by the DHO adjustment data, the positioning control program shifts the write head downward. If the DHO adjustment data is smaller than the predetermined value, the positioning control program leaves the user data write position unadjusted in order to avoid write performance deterioration.

In the above instance, the write head 204 is placed at the position 214, which is at a distance of the DHO [distance] 203. The write head 204 writes user data 313 at position 214 within a data area. When the positioning control program makes a DHO correction for the purpose of reading the user data 313 written at the position 214, the positioning control program calculates the DHO [calculation] 208 for the target servo track 201 at 10 tracks. Therefore, the read head 202 is placed at the position 214 to accurately read the written user data 313. When a method for adjusting the user data write position at the time of a write as indicated in FIG. 8 is used, the read head 204 constantly needs to read the DHO adjustment data and judge whether or not to adjust the write position. Therefore, such a method is more disadvantageous than the method for adjusting the DHO correction at the time of a read. However, the former method is highly useful in applications where the access time required for a read is more important than the access time required for a write.

Figure 9:
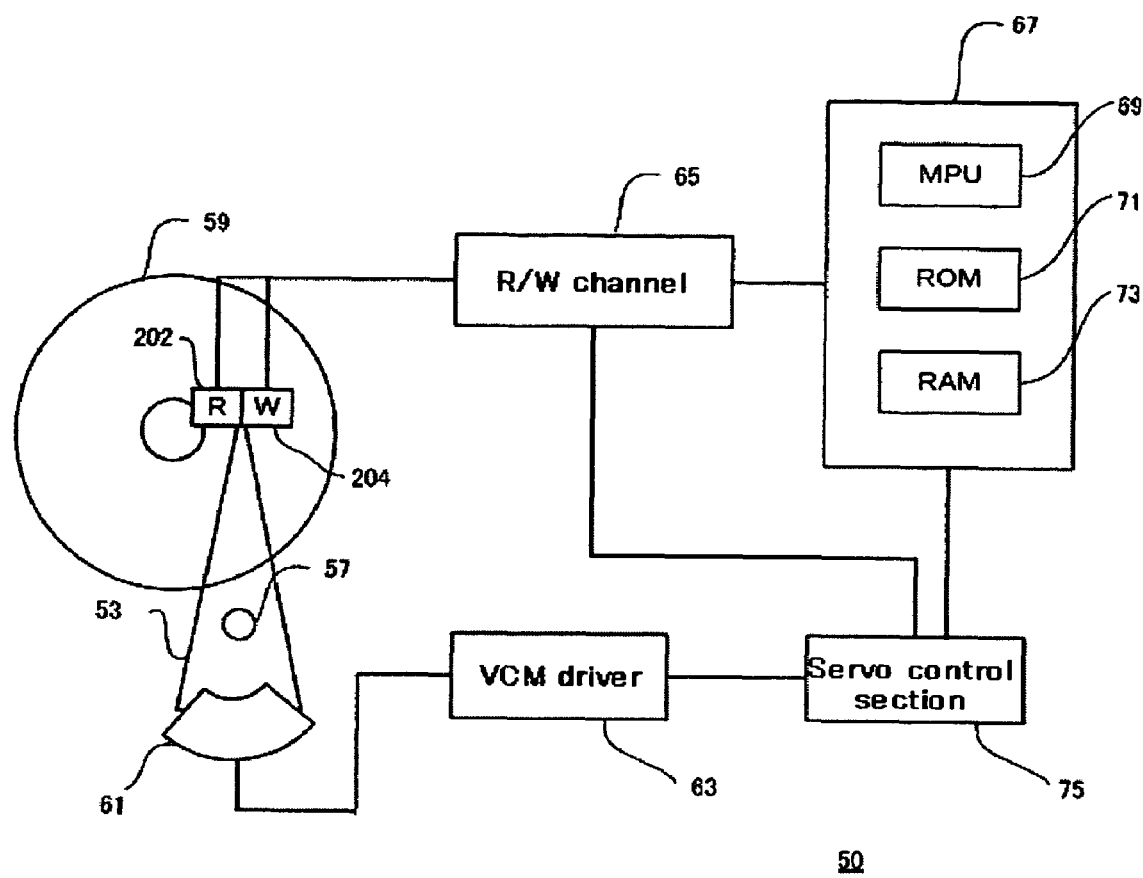
FIG. 9 is a block diagram illustrating major components of a magnetic disk drive.
Figure 10:
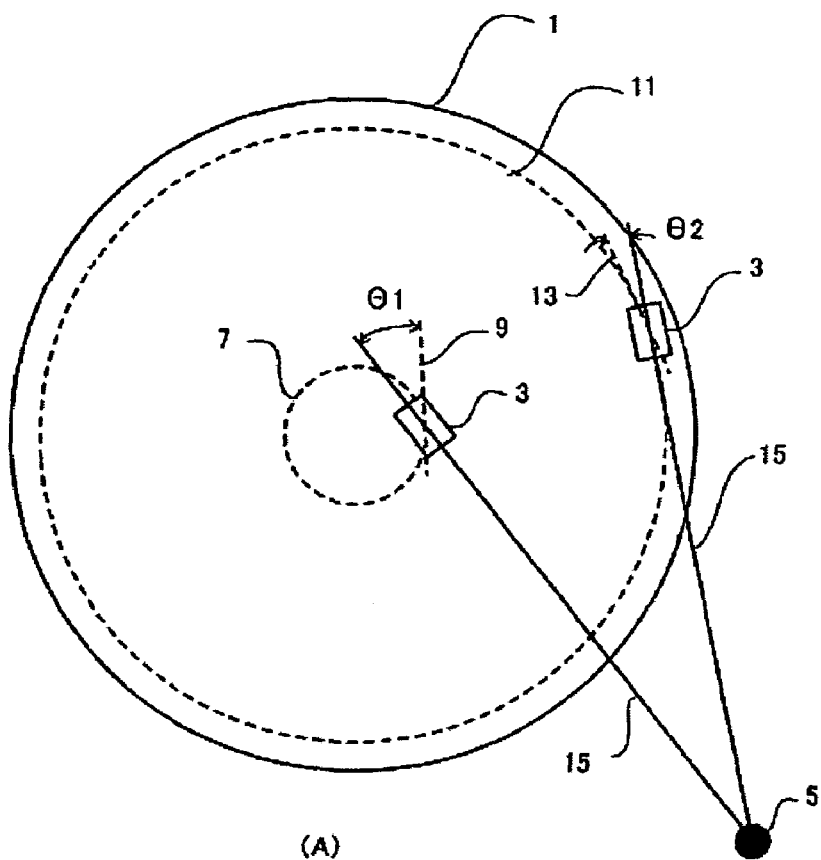
FIGS. 10(A) and 10(B) illustrate how a DHO is generated.
Figure 10:
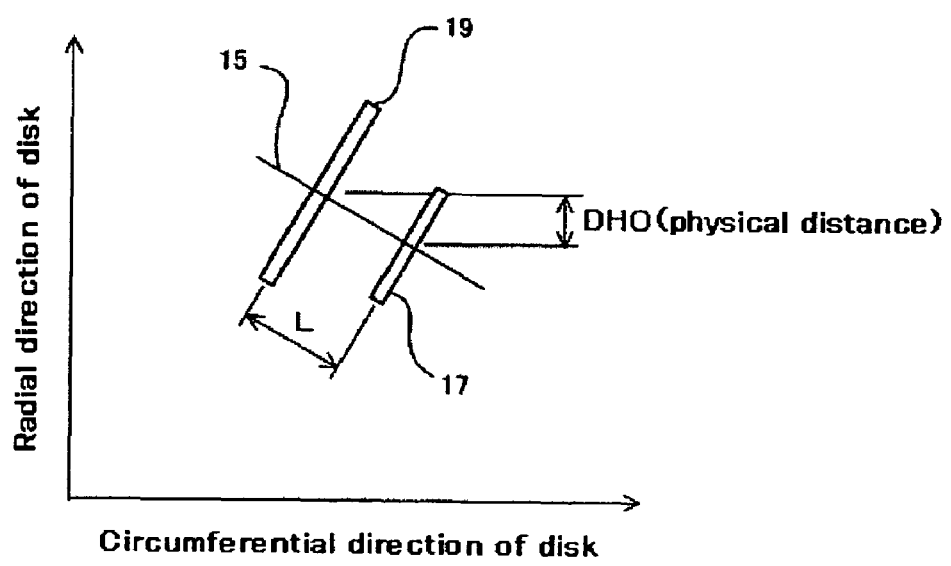
Figure 11:
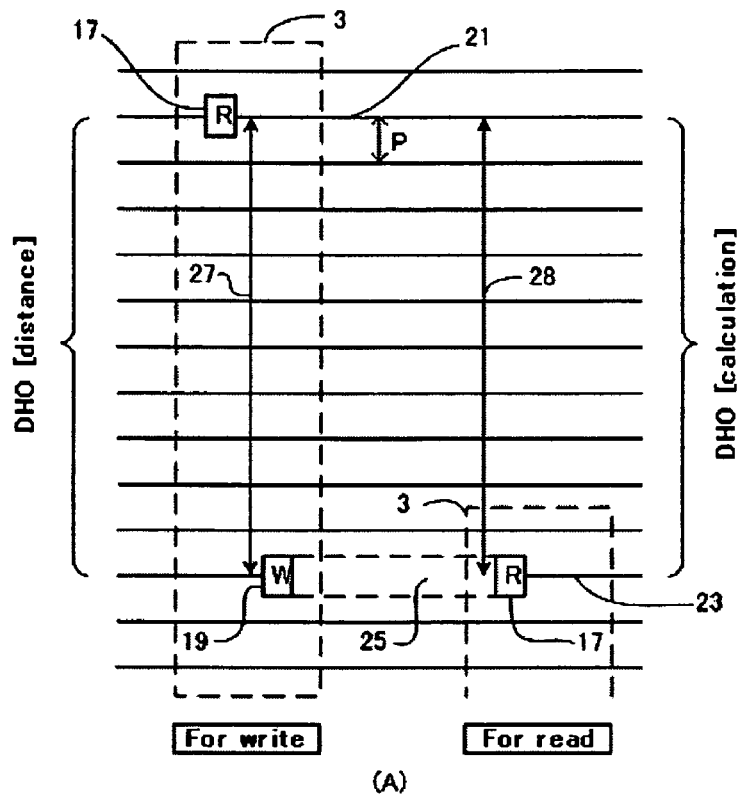
FIGS. 11(A) and 11(B) illustrate a situation in which a DHO correction cannot be accurately made because of track pitch variation.
Figure 11:
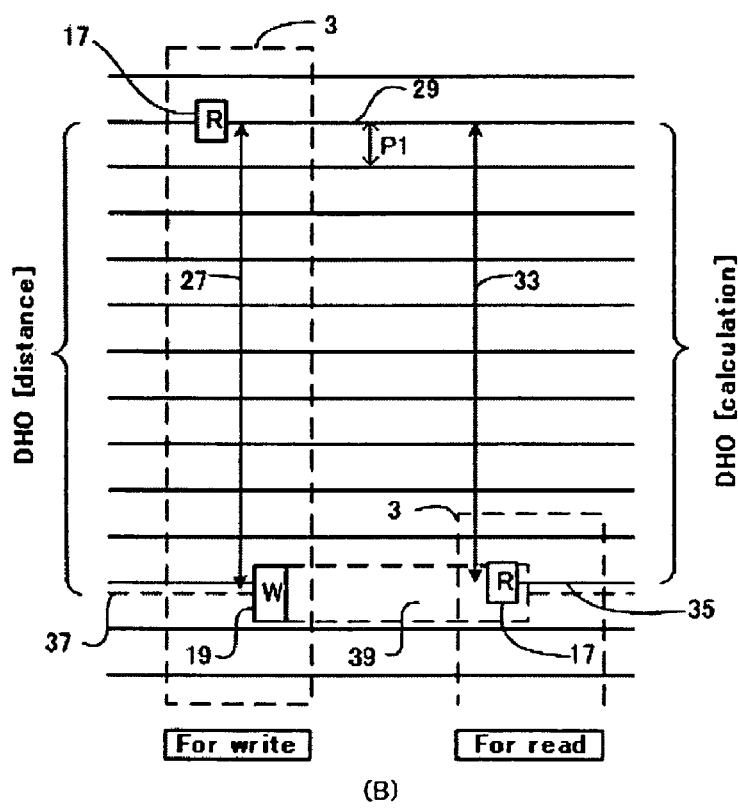

FIG. 9 is a block diagram illustrating major components of the magnetic disk drive 50 that is shown in FIG. 1. The magnetic disk drive 50 includes the magnetic disk 59, read head 202, write head 204, head support mechanism 53, and voice coil motor 61, which have been described with reference to FIG. 1. The read head 202 and write head 204 are formed on the same slider and positioned at a predetermined spacing interval. The read head 202, write head 204, and slider compose the head/slider assembly. The head support mechanism 53 is driven by the voice coil motor (hereinafter referred to as the VCM) 61 to pivot on the pivot shaft 57 and position the head/slider assembly over a specified track.

A read/write channel 65 processes a signal that is read from the magnetic disk by the read head 202, and forwards the processed signal to a control section 67. Further, the read/write channel 65 receives a write signal from the control section 67, processes the received write signal to generate a write current, and forwards the write current to the write head 204. Furthermore, the read/write channel 65 sends a servo data signal, which is read by the read head 202, to the control section 67 and a servo control section 75. The control section 67 includes a microprocessing unit (MPU) 69, a read-only memory (ROM) 71, and a random-access memory (RAM) 73, and exercises operational control over the entire magnetic disk drive 50. The positioning control program and a DHO table are recorded in the ROM 71. The DHO table stores the DHO [measurement], which is measured DHO data concerning major servo tracks of the magnetic disk 59. The DHO [measurement] represents the number of radially arranged, typical servo tracks, which is counted prior to magnetic disk drive shipment. The MPU 69 references the DHO [measurement] in the DHO table for use in a linear interpolation expression for the DHO [calculation] at the time of positioning control program execution.

The MPU 69 executes the positioning control program, generates a head position signal for positioning the read head 202 for a user data read/write, and forwards the generated signal to the servo control section 75. When making a DHO correction for the purpose of positioning the read head for a user data read, the MPU 69 calculates the DHO [calculation] for servo tracks irrelevant to the DHO [measurement], and forwards the DHO [calculation] to the servo control section 75. Further, the MPU 69 executes the positioning control program and sends the number of servo tracks for read head position adjustment to the servo control section 75 in accordance with a DHO adjustment data read signal received from the read/write channel 65.

The servo control section 75 receives a servo data read signal from the R/W channel 65, generates a signal for placing the read head 202 at a position designated by the control section 67, and forwards the generated signal to a VCM driver 63. The VCM driver 63 receives the signal from the servo control section 75, converts the received signal to a drive current, and delivers the drive current to the VCM 61. The VCM 61 drives the head support mechanism 53 to position the read head 202 over a specified servo track.

The amount of DHO correction displacement, which is based on servo track pitch changes, cumulatively increases with an increase in the value of the DHO [calculation]. Therefore, the read/write method according to the present embodiment is particularly effective for magnetic disk drives having a narrow servo track pitch. The method is also effective for magnetic disk drives in which servo data is written by a self servo write method because the write head center and read head center do not align with a pivot center line so that the DHO [distance] increases to increase the associated DHO [calculation] (track count).

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic disk drive comprising:
   a slider on which a write head and a read head are positioned at a predetermined spacing interval;
   a head support mechanism that carries said slider and pivots on a rotation shaft;

a magnetic disk on which DHO (Dual Head Offset) adjustment data is written and placed at a DHO-corrected position of said read head for reading user data written at a target position; and a processor configured to exercise operational control over said magnetic disk drive to read said DHO adjustment data, adjust the position of said read head, and read said user data, wherein said DHO adjustment data is the number of servo tracks that are written on said magnetic disk and placed between said target position and a position at which said user data is written.

2. The magnetic disk drive according to claim 1, wherein said DHO adjustment data is written in a servo sector.

3. The magnetic disk drive according to claim 2, wherein said DHO adjustment data is written on all servo tracks of said magnetic disk including an innermost servo track and an outermost servo track.

4. The magnetic disk drive according to claim 2, wherein a plurality of said DHO adjustment data are circumferentially written on the same servo track.

5. The magnetic disk drive according to claim 1, wherein said DHO adjustment data is written in a data sector of said magnetic disk.

6. The magnetic disk drive according to claim 5, wherein said DHO adjustment data is circumferentially written in a plurality of data sectors concerning the same servo track on said magnetic disk.

7. The magnetic disk drive according to claim 1, wherein said DHO adjustment data is the number of servo tracks, which corresponds to the difference between a first position, which is the position of said write head that prevails when said read head is placed at a target position, and a second position, which is obtained by counting the number of said servo tracks that are written on said magnetic disk and placed between said target position and said first position and by making a DHO correction.

8. The magnetic disk drive according to claim 1, wherein said magnetic disk drive writes servo data onto said magnetic disk by a self servo write method.

9. A method for reading/writing user data in a magnetic disk drive that comprises a magnetic disk and a slider on which a write head and a read head are positioned at a predetermined spacing interval, the method comprising:

placing said read head at a target position and writing said user data at a first position with said write head;

a DHO (Dual Head Offset) correction step including making a DHO correction of said first position and placing said read head at a second position;

a first read step including reading said user data at said second position;

a DHO adjustment data read step including reading DHO adjustment data, which is written at said second position and corresponds to the difference in servo tracks between said first position and said second position; and a second read step including adjusting the position of said read head and reading said user data in response to said DHO adjustment data read step.

10. The method according to claim 9, wherein said DHO correction step includes counting the number of servo tracks that are written on said magnetic disk and placed between said target position and said first position.

11. The method according to claim 9, wherein said first read step includes detecting a read error.

12. The method according to claim 9, wherein said second read step adjusts the position of said read head only when said read error is detected.

13. A magnetic disk drive comprising:

a slider on which a write head and a read head are positioned at a predetermined spacing interval;

a head support mechanism that carries said slider and pivots on a rotation shaft;

a magnetic disk on which DHO (Dual Head Offset) adjustment data is written and placed at a target position for a user data write; and a processor configured to exercise operational control over said magnetic disk drive to read said DHO adjustment data with said read head, adjust the position of said read head, and write said user data, wherein said DHO adjustment data is the number of servo tracks, which corresponds to the difference between a position that is obtained by counting the number of said servo tracks, which are written on said magnetic disk from said target position, and by making a DHO correction of said read head, and the position of user data written at said target position.

14. The magnetic disk drive according to claim 13, wherein said DHO adjustment data is circumferentially written in a plurality of data sectors concerning the same servo track on said magnetic disk.

15. The magnetic disk drive according to claim 13, wherein said DHO adjustment data is written in a plurality of servo sectors concerning the same servo track on said magnetic disk.

16. A method for reading/writing user data in a magnetic disk drive that comprises a magnetic disk on which a servo track is written, and a slider on which a write head and a read head are positioned at a predetermined spacing interval, the method comprising:

a DHO (Dual Head Offset) adjustment data read step including placing said read head at a target position and reading DHO adjustment data from the magnetic disk;

a position adjustment step including adjusting the position of said write head in response to said DHO adjustment data read step; and writing said user data with said write head whose position is adjusted, wherein said DHO adjustment data is a value for correcting a DHO correction error, which is caused by servo track pitch variation.

17. The method according to claim 16, wherein said position adjustment step includes leaving the position of said write head unadjusted depending on the value of said DHO adjustment data.

* * * * *